United States Patent
Wilkins et al.

(10) Patent No.: US 9,531,990 B1
(45) Date of Patent: Dec. 27, 2016

(54) COMPOUND PREDICTION USING MULTIPLE SOURCES OR PREDICTION MODES

(75) Inventors: Paul Gordon Wilkins, Cambridge (GB); Yaowu Xu, San Diego, CA (US)

(73) Assignee: GOOGLE INC., Mountain View, CA (US)

( * ) Notice: Subject to any disclaimer, the term of this patent is extended or adjusted under 35 U.S.C. 154(b) by 1181 days.

(21) Appl. No.: 13/355,522

(22) Filed: Jan. 21, 2012

(51) Int. Cl.
*H04N 7/50* (2006.01)
*H04N 7/00* (2011.01)

(52) U.S. Cl.
CPC ........................................ *H04N 7/00* (2013.01)

(58) Field of Classification Search
USPC ...................................................... 375/240.2
See application file for complete search history.

(56) References Cited

U.S. PATENT DOCUMENTS

| | | | |
|---|---|---|---|
| 5,144,426 A | 9/1992 | Tanaka et al. | |
| 5,737,020 A | 4/1998 | Hall et al. | |
| 5,838,597 A | 11/1998 | Pau et al. | |
| 6,032,113 A | 2/2000 | Graupe | |
| 6,134,518 A | 10/2000 | Cohen et al. | |
| 6,144,322 A | 11/2000 | Sato | |
| 6,157,676 A | 12/2000 | Takaoka et al. | |
| 6,373,895 B2 | 4/2002 | Saunders et al. | |
| 6,449,312 B1 | 9/2002 | Zhang et al. | |
| 7,266,150 B2 | 9/2007 | Demos | |
| 7,466,774 B2 | 12/2008 | Boyce | |
| 7,529,302 B2 | 5/2009 | Mukerjee et al. | |
| 7,580,456 B2 * | 8/2009 | Li et al. .......................... 375/240 |
| 7,606,310 B1 | 10/2009 | Ameres et al. | |
| 7,733,380 B1 * | 6/2010 | Cote et al. ................. 348/222.1 |
| 7,809,059 B2 | 10/2010 | Yin et al. | |
| 8,005,144 B2 * | 8/2011 | Ji et al. ..................... 375/240.16 |
| 8,085,845 B2 * | 12/2011 | Tourapis et al. ......... 375/240.16 |
| 8,085,846 B2 | 12/2011 | Tourapis et al. | |
| 8,135,064 B2 | 3/2012 | Tasaka et al. | |
| 8,457,200 B2 | 6/2013 | Andersson et al. | |
| 8,644,374 B2 | 2/2014 | Chou et al. | |

(Continued)

FOREIGN PATENT DOCUMENTS

| CN | 102186086 A | * | 9/2011 | |
|---|---|---|---|---|
| JP | 2005348280 A | * | 12/2005 | ............... H04N 7/32 |

(Continued)

OTHER PUBLICATIONS

Seiler et al. "Spatio-Temporal Prediction in Video Coding by Spatially Refined Motion Compensation," ICIP, 2008, pp. 2788-2791.*

(Continued)

*Primary Examiner* — Dave Czekaj
*Assistant Examiner* — Shanika Brumfield
(74) *Attorney, Agent, or Firm* — Young Basile Hanlon & MacFarlane, P.C.

(57) ABSTRACT

The subject disclosure relates to implementing a device to find two or more predictor blocks in one or more reference frames and to generate a new predictor block by combining weighted pixels or weighted prediction modes of the two or more predictor blocks. The one or more reference frames can include one or more previously coded reference frames and/or a current frame. Weight for a particular one of the weighted pixels can be uniquely determined.

20 Claims, 11 Drawing Sheets

(56) References Cited

U.S. PATENT DOCUMENTS

| | | | |
|---|---|---|---|
| 8,705,616 | B2 | 4/2014 | He et al. |
| 8,718,140 | B1 | 5/2014 | Cai et al. |
| 8,737,824 | B1 | 5/2014 | Bultje |
| 9,185,414 | B1 | 11/2015 | Suvanto |
| 2002/0181594 | A1 | 12/2002 | Katsavounidis et al. |
| 2003/0012285 | A1 | 1/2003 | Kim |
| 2003/0012287 | A1 | 1/2003 | Katsavounidis et al. |
| 2003/0014674 | A1 | 1/2003 | Huffman et al. |
| 2003/0022102 | A1 | 1/2003 | Hiraoka et al. |
| 2003/0026343 | A1 | 2/2003 | Kim et al. |
| 2003/0061040 | A1 | 3/2003 | Likhachev et al. |
| 2003/0227977 | A1 | 12/2003 | Henocq |
| 2004/0051798 | A1 | 3/2004 | Kakarala et al. |
| 2005/0018772 | A1 | 1/2005 | Sung et al. |
| 2005/0105614 | A1 | 5/2005 | Katsavounidis et al. |
| 2005/0105625 | A1 | 5/2005 | Kim et al. |
| 2005/0149831 | A1 | 7/2005 | Katsavounidis et al. |
| 2005/0207497 | A1 | 9/2005 | Rovati et al. |
| 2005/0254584 | A1 | 11/2005 | Kim et al. |
| 2006/0029136 | A1 | 2/2006 | Cieplinski et al. |
| 2006/0215751 | A1 | 9/2006 | Reichel et al. |
| 2006/0245497 | A1 | 11/2006 | Tourapis et al. |
| 2007/0047648 | A1 | 3/2007 | Tourapis et al. |
| 2007/0047649 | A1 | 3/2007 | Suzuki et al. |
| 2007/0053427 | A1 | 3/2007 | Henocq |
| 2007/0098067 | A1* | 5/2007 | Kim et al. .............. 375/240.08 |
| 2007/0140352 | A1 | 6/2007 | Bhaskaran et al. |
| 2007/0153897 | A1 | 7/2007 | Yan |
| 2007/0153899 | A1 | 7/2007 | Koto et al. |
| 2007/0206931 | A1* | 9/2007 | Barbieri et al. ............. 386/109 |
| 2008/0056356 | A1 | 3/2008 | Wang et al. |
| 2008/0130754 | A1* | 6/2008 | Winger .................. 375/240.21 |
| 2008/0212678 | A1 | 9/2008 | Booth et al. |
| 2008/0247464 | A1 | 10/2008 | Seregin et al. |
| 2008/0260031 | A1* | 10/2008 | Karczewicz ............ 375/240.15 |
| 2008/0267292 | A1* | 10/2008 | Ito et al. .................. 375/240.16 |
| 2008/0285655 | A1 | 11/2008 | Au et al. |
| 2009/0010556 | A1 | 1/2009 | Uchibayashi et al. |
| 2009/0110067 | A1 | 4/2009 | Sekiguchi et al. |
| 2009/0175338 | A1 | 7/2009 | Segall |
| 2009/0196342 | A1 | 8/2009 | Divorra Escoda et al. |
| 2009/0232207 | A1 | 9/2009 | Chen |
| 2009/0257492 | A1 | 10/2009 | Andersson et al. |
| 2009/0257495 | A1 | 10/2009 | Chujoh et al. |
| 2010/0034260 | A1 | 2/2010 | Shimizu et al. |
| 2010/0128995 | A1 | 5/2010 | Drugeon et al. |
| 2010/0150394 | A1 | 6/2010 | Bloom et al. |
| 2010/0177826 | A1 | 7/2010 | Bhaumik et al. |
| 2010/0195715 | A1 | 8/2010 | Liu et al. |
| 2010/0220790 | A1 | 9/2010 | Jeon et al. |
| 2010/0278269 | A1 | 11/2010 | Andersson et al. |
| 2010/0290530 | A1 | 11/2010 | Huang et al. |
| 2010/0303149 | A1 | 12/2010 | Yasuda et al. |
| 2010/0322306 | A1 | 12/2010 | Au et al. |
| 2011/0002386 | A1* | 1/2011 | Zhang ..................... 375/240.15 |
| 2011/0051804 | A1 | 3/2011 | Chou et al. |
| 2011/0182357 | A1* | 7/2011 | Kim et al. .............. 375/240.12 |
| 2011/0200109 | A1 | 8/2011 | Joshi et al. |
| 2011/0202160 | A1* | 8/2011 | Moyne ........................ 700/104 |
| 2011/0222608 | A1 | 9/2011 | Gao et al. |
| 2011/0228840 | A1* | 9/2011 | Yamori ................... 375/240.03 |
| 2011/0228858 | A1 | 9/2011 | Budagavi et al. |
| 2011/0235930 | A1* | 9/2011 | Kim et al. ................... 382/238 |
| 2011/0243229 | A1 | 10/2011 | Kim et al. |
| 2011/0249734 | A1 | 10/2011 | Segall et al. |
| 2011/0249741 | A1 | 10/2011 | Zhao et al. |
| 2011/0261886 | A1 | 10/2011 | Suzuki et al. |
| 2011/0280304 | A1* | 11/2011 | Jeon et al. ............... 375/240.12 |
| 2012/0008683 | A1 | 1/2012 | Karczewicz et al. |
| 2012/0027094 | A1 | 2/2012 | Sato et al. |
| 2012/0201293 | A1 | 8/2012 | Guo et al. |
| 2012/0250769 | A1* | 10/2012 | Bross et al. |
| 2012/0300837 | A1 | 11/2012 | Wilkins et al. |
| 2012/0307884 | A1 | 12/2012 | MacInnis |
| 2013/0016785 | A1 | 1/2013 | Wang et al. |
| 2013/0022102 | A1 | 1/2013 | Casula |
| 2013/0022117 | A1 | 1/2013 | Lou et al. |
| 2013/0022119 | A1 | 1/2013 | Chien et al. |
| 2013/0027230 | A1 | 1/2013 | Marpe et al. |
| 2013/0051467 | A1 | 2/2013 | Zhou et al. |
| 2013/0129237 | A1 | 5/2013 | Yie et al. |
| 2013/0259129 | A1 | 10/2013 | Sato |
| 2014/0140408 | A1 | 5/2014 | Lee et al. |

FOREIGN PATENT DOCUMENTS

| | | | |
|---|---|---|---|
| JP | 2007267414 | | 10/2007 |
| KR | 20120135828 | | 12/2012 |
| WO | WO2009051419 | | 4/2009 |
| WO | WO 2012126340 A1 * | | 9/2012 |

OTHER PUBLICATIONS

Chen, et al., "SaVE: Sensor-assisted Motion Estimation for Efficient H.264/AVC Video Encoding." MM'09, Oct. 19-24, 2009, 10 pages, ACM, Beijing, China.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Guillotel, Philippe, et al.; "Comparison of motion vector coding techniques", SPIE vol. 2308, 1994, 11 pp.

H.264 video compression standard.: New possibilities within video surveillance. 2008, 10 pages, Axis Communications.

ISR and Written Opinion of the International Searching Authority for International Application No. PCT/US2012/021599 , Mar. 28, 2012.

ISR and Written Opinion of the International Searching Authority for International Application No. PCT/US2012/021606, Mar. 28, 2012.

J. Jung, "Core Experiment 9: Motion Vector Coding," Document # JCTVC-C509, Guangzhou, China, Oct. 2010.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Li B., et al., "Redundancy reduction in Cbf and merge coding", Document # JCTVC-C277, p. 6, Oct. 2, 2010.

Li S., et al.; "Direct Coding for Bipredicitive Slices in the H.264 Standard," IEEE Transactions on Circuits and Systems for Video Technology; vol. 15; No. 1; pp. 119-126; Jan. 1, 2005.

Liu, Bede, et al.; "A simple method to segment motion field for video coding", SPIE vol. 1818, Visual Communications and Image Processing 1992, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

(56) References Cited

OTHER PUBLICATIONS

Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Seiler, et al., "Spatio-Temporal Prediction in Video Coding by Spatially Refined Motion Compensation," ICIP, 2008, pp. 2788-2791.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Winken (Fraunhofer HHI) M. et al., "Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); URL:http://wftp3.itu.int/AV-ARCH/JCTVC-SITE/, No. 24 Apr. 2010, all pages.
Xiao, "Macroblock Level Hybrid Temporal-Spatial Prediction for H.264/AVC," Circuits and Systems (ISCAS), Proceedings of 2010 IEEE International Symposium, Paris, 4 pages.
Yusuke Itani et al., "Adaptive Direct Vector Derivation for Video Coding," Picture Coding Symposium, Dec. 8, 2010 C509, Guangzhou, China, Oct. 2010.
Mozilla. "Introduction to Video Coding Part 1: Transform Coding", published online at: [http://people.xiph.org/~tterribe/pubs/lca2012/auckland/intro_to_video1.pdf], retrieved Mar. 22, 2012, 171 pages.
Bankoski et al. "Technical Overview of VP8, an Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Cassidy, An analysis of VP8, a new video codec for the web, 148 pages. Nov. 2011.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Overview; VP7 Data Format and Decoder. Version 1.5. On2 Technologies, Inc. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
WebM Project, WebM Video Hardware RTLs, http://www.webmproject.org/hardware/, 3 pp, (Jun. 27, 2012).
Wikipedia, the free encyclopedia, "Application-specific integrated circuit", http://en.wikipedia.org/wiki/Application-specific_integrated_circuit, 7 pp (Jun. 27, 2012).
Kuroki et al., Adaptive Arithmetic Coding for Image Prediction Errors, 2004.
Somasundaram et al., A Pattern-Based Residual Vector Quantization Algorithm (PBRVQ) for Compressing Images, 2009.
Sun et al., Motion-Compensated Vector Quantization with a Dynamic Codebook, 1990.

\* cited by examiner

COMPOUND PREDICTION USING MULTIPLE SOURCES OR PREDICTION MODES

TECHNICAL FIELD

This disclosure relates generally to video processing, and more specifically, to prediction using multiple sources or prediction modes.

BACKGROUND

The amount of data representing media information, such as a still image and video image, can be extremely large. Further, transmitting digital video information over communication networks can consume large amounts of bandwidth. The cost of transmitting data from one location to another is a function of number of bits transmitted per second. Typically, higher bit transfer rates are associated with increased cost. Higher bit rates can also progressively add to required storage capacities of memory systems, thereby increasing storage cost. Thus, at a given quality level, it can be much more cost effective to use fewer bits, as opposed to more bits, to store digital images and videos. It therefore can be desirable to compress media data for recording, transmitting, or storing.

For a typical compression scheme, achieving higher media quality requires more bits used, which can, in turn, increase cost of transmission and storage. While lower bandwidth traffic may be desired so may higher quality media.

An encoder is a device capable of encoding (e.g., coding) (and sometimes decoding) digital media data. A decoder is a device capable of decoding digital media data. A codec is a device capable of coding and/or decoding digital media data. The term codec is derived from a combination of the terms code and decode, or the terms compress and decompress. A variety of codecs are commercially available. Generally speaking, for example, codec classifications include discrete cosine transfer codecs, fractal codecs, and wavelet codecs. An encoder or codec, by encoding the digital media data, can reduce the number of bits required to transmit signals thereby reducing associated transmission costs.

Video bitstreams typically include prediction of data and a residual error signal that corrects errors in the prediction. Conventional codecs, such as MPEG-2 codecs and H.264 codecs, can generate an inter predictor by employing a first motion vector to obtain a predictor from a past frame and a second motion vector, which can be derived from the first motion vector, to obtain a predictor from a future frame. As such, a new predictor can be generated by combining the predictor from the past frame and the predictor from the future frame. The quality of decoded output bitstreams and the data rate required to achieve desired output quality for conventional codecs can be improved by improving the quality of the prediction. However, prediction methods for conventional codecs still result in a large amount of encoded data.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, an identification component is configured to find two or more predictor blocks in one or more coded reference frames, where the one or more coded reference frames include one or more previously coded references frames and/or a current frame, and a processing component is configured to generate a new predictor block by combining weighted pixels or weighted prediction modes of the two or more predictor blocks, where weight for a particular one of the weighted pixels is uniquely determined.

Additionally, a non-limiting implementation provides for finding two or more predictor blocks in one or more previously coded reference frames, and combining data from the two or more predictor blocks to generate a new predictor block, where relative weight for the data in the two or more predictor blocks is uniquely determined.

Furthermore, a non-limiting implementation provides for finding one or more predictor blocks in a previously coded reference frame and one or more predictor blocks in a current frame, and combining data from the one or more predictor blocks in the previously coded reference frame and data from the one or more predictor blocks in the current frame to generate a new predictor block, where relative weight for the data in the one or more predictor blocks in the previously coded reference frame and relative weight for the data in the one or more predictor blocks in the current frame is uniquely determined.

In addition, a non-limiting implementation provides for finding a first previously coded block in a first previously coded region in a current frame, finding a second previously coded block in a second previously coded region in the current frame, duplicating values from a first set of previously coded pixels from the first previously coded block to generate a first primary predictor block, duplicating values from a second set of previously coded pixels from the second previously coded block to generate a second primary predictor block, and combining data from the first primary predictor block and data from the second primary predictor block to generate a new predictor block.

In accordance with another implementation, a system provides means for finding two or more predictor blocks in one or more coded reference frames, where the one or more coded reference frames include one or more previously coded references frames and/or a current frame, and means for generating a new predictor block by combining weighted pixels or weighted prediction modes of the two or more predictor blocks, where weight for a particular one of the weighted pixels is uniquely determined.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
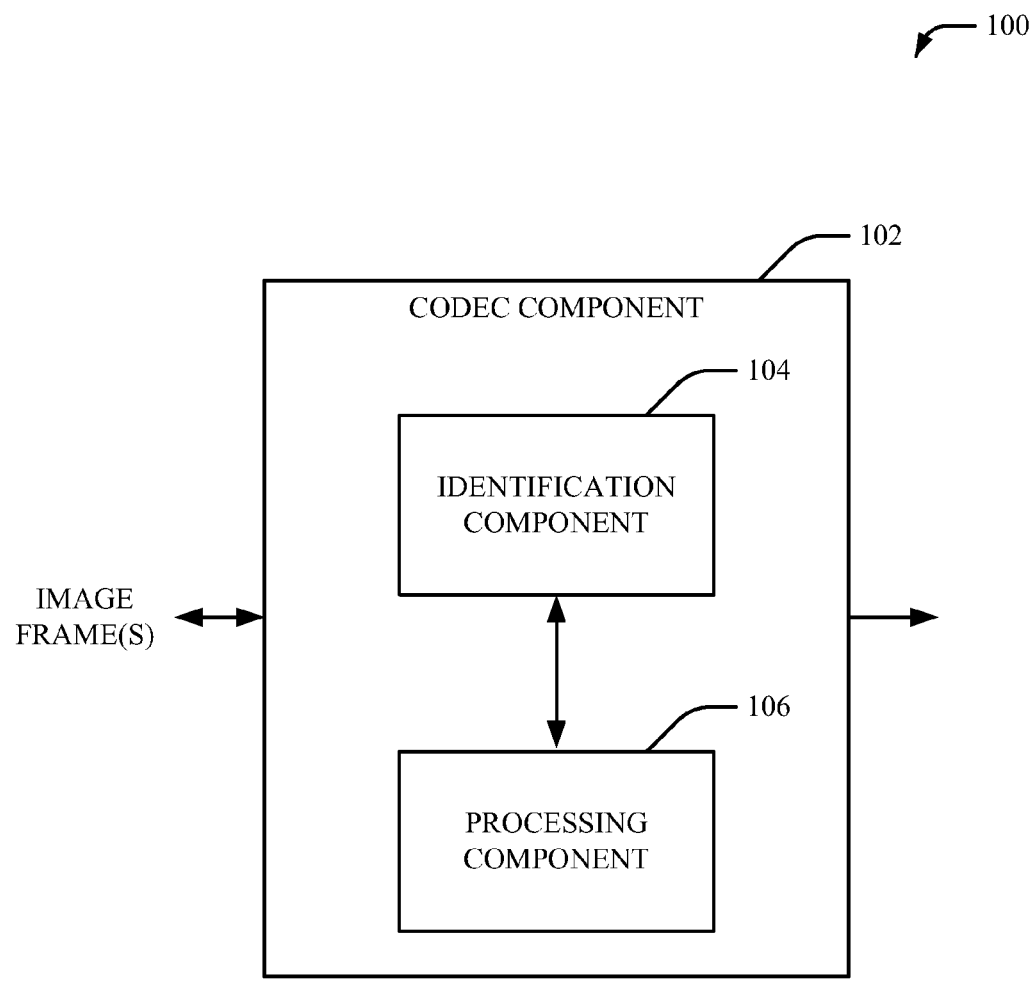
FIG. 1 illustrates a high-level functional block diagram of an example codec system in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Codecs are generally utilized to encode and/or decode information through compression and decompression. Systems and methods disclosed herein relate to generating a compound predictor by combining two or more primary predictors derived from the same or from different reference frames in image or video objects that use circuitry and/or instructions stored or transmitted in a computer readable medium in order to provide improved compression, image quality and/or system efficiency. The compound predictor can be combined by performing weighted combination, averaging and/or filtering of the two or more primary predictors. Therefore, the amount of encoded media data can be reduced. As such, the data rate required to achieve desired output quality can be reduced. Additionally, the quality of decoded output can be improved.

Referring initially to FIG. 1, there is illustrated an example system 100 that implements compound prediction using multiple sources or prediction modes, according to an aspect of the subject disclosure. For example, the system 100 can arbitrarily combine a plurality of predictors from different sources to generate a new compound predictor. Specifically, the system 100 can provide a codec with an identification feature and a processing feature that can be utilized in most any encoding and/or decoding application. The identification feature can find predictor blocks in one or more coded reference frames and the processing feature can generate the new compound predictor by combining data from the predictor blocks. The system 100 can be employed by various systems, such as, but not limited to, image and video capturing systems, media player systems, televisions, cellular phones, tablets, personal data assistants, gaming systems, computing devices, and the like.

In particular, the system 100 can include a codec component 102. The codec component 102 can include an identification component 104 and a processing component 106. The codec component 102 can receive one or more frames, e.g., input video signals represented as a series of image frames. The identification component 104 can be configured to find two or more predictor blocks in one or more coded reference frames. The one or more coded reference frames can include one or more previously coded reference frames and/or a previously coded region of a current frame. The one or more coded reference frames can include a past frame, a current frame and/or a future frame with one or more previously coded regions. In one example, the one or more coded reference frames can be stored in one or more reference buffers. For example, the one or more coded reference frames can include one or more reference buffers. The one or more reference buffers can be one or more previously coded, but hidden, reference buffers which do not correspond to a specific individual frame in an input video source (e.g., IMAGE FRAME(S)). Accordingly, the one or more reference buffers may not have a direct 1:1 correspondence to a real frame in an input video sequence (e.g., IMAGE FRAME(S)). The system 100 can be configured to combine two or more inter predictor modes (e.g., using data from previously encoded frames), combine one or more inter predictor modes and one or more intra predictor modes (e.g., using data within a single frame) and/or combine two or more intra predictor modes.

The processing component 106 is/can be configured to generate a new predictor block by combining data from the two or more predictor blocks (e.g., from one or more coded reference frames). For example, the processing component 106 can be configured to generate a new predictor block by combining weighted pixels or weighted prediction modes of the two or more predictor blocks. The weight for a particular one of the pixels can be uniquely determined. Furthermore, the weight for a particular one of the pixels can be explicitly or implicitly coded. For example, each of the pixels can be uniquely multiplied by a predetermined constant. In one example, weight for each of the pixels can depend on temporal and/or spatial distance of predictor blocks. In another example, weight for each of the pixels can be a predetermined weight.

The processing component 106 can also be configured to combine motion vectors from the two or more predictor blocks. As such, the processing component 106 can implement spatial and/or temporal correlation. For example, weight for each of the pixels can depend on the length of motion vectors corresponding to spatial offset and/or distance. The weight for pixels can also be based on quality of previous predictor blocks (e.g., determined quality of output media data). However, it is to be appreciated that weight for each of the pixels can be computed and/or implemented differently to meet the design criteria of a particular implementation. Additionally or alternatively, the processing component 106 can be configured to generate a new predictor block by performing one or more averaging and/or filtering operations on the output of the two or more predictor blocks. In one example, values of one or more previously coded pixels from a particular predictor block can be duplicated to generate a primary predictor block. Therefore, one or more primary predictor blocks and/or one or more non-primary predictor blocks can be combined to generate a new predictor block.

While FIG. 1 depicts separate components in system 100, it is to be appreciated that the components may be implemented in a common component. For example, the identification component 104 and the processing component 106 can be included in a single component. Further, it can be appreciated that the design of system 100 can include other component selections, component placements, etc., to combine two or more primary predictors derived from the same or from different reference frames.

Figure 2:
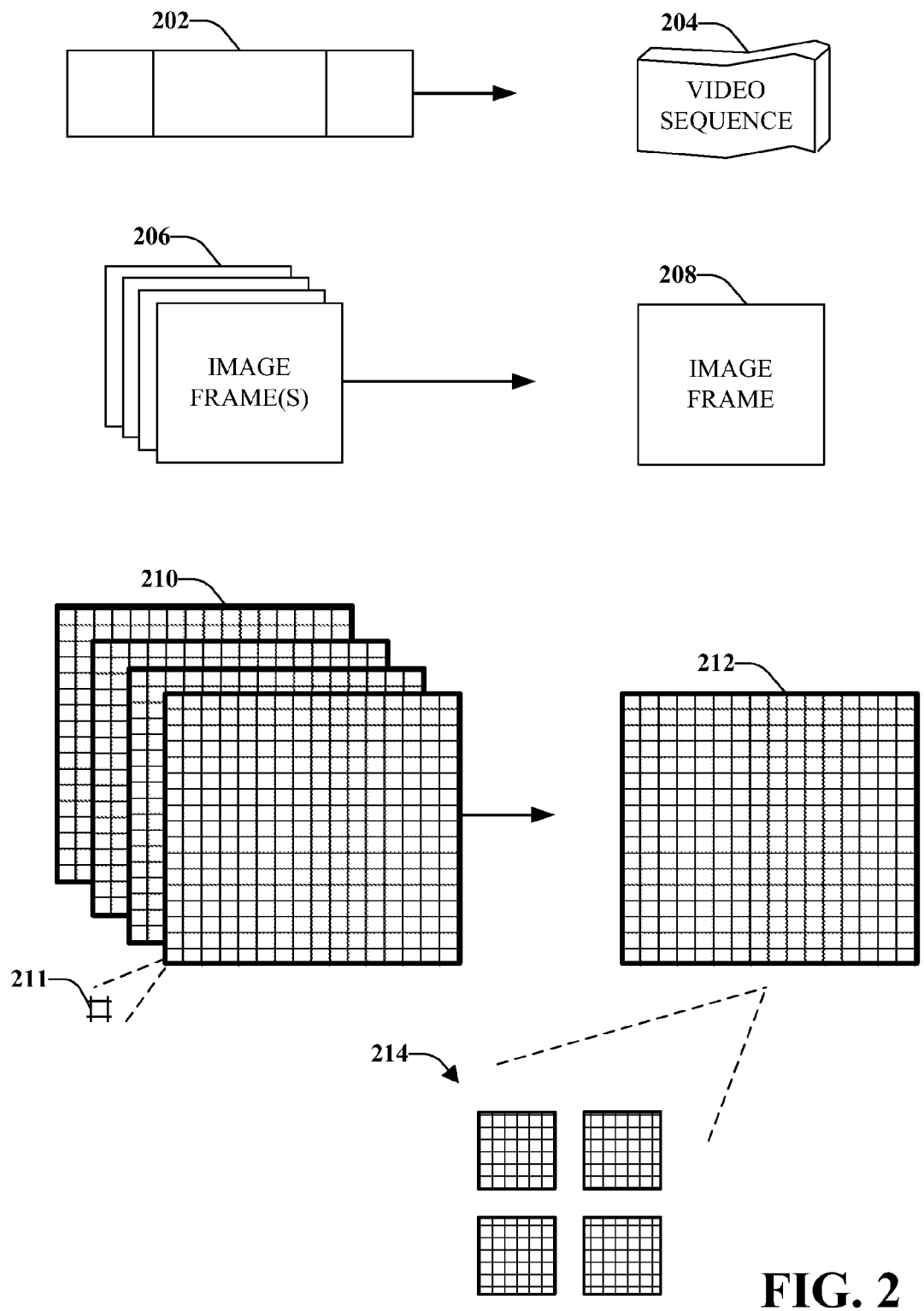
FIG. 2 illustrates an exemplary organization of media information in accordance with various aspects of the disclosed subject matter.

Referring to FIG. 2, there is illustrated an exemplary organization of media information, according to an aspect of the subject disclosure. As shown, a video input 202 can be divided into video sequence(s) 204. The video sequence 204 can be further represented by a set of image frames 206. An image frame 208 from the set of image frames 206 can be divided into sets of individual image pixels values arranged in blocks or matrices, for example, as a set of macroblocks 210. Each macroblock 212 of the set of macroblocks 210 can be represented as a set of image pixels 211.

Each macroblock 212 from the set of macroblocks 210 can consist of a plurality of smaller blocks 214. The blocks 214 can be one or more, N×M blocks of luma pixels (Y), representing luminance, and one or more, P×I blocks of chroma pixels (U,V), representing chrominance, wherein N, M, P and I are all integers and x represents multiplication. In one non-limiting example, the integers can be multiples of 4. However, it is to be appreciated that the integers can be any integer value. Likewise, N and M can be the same integer, P and I can be the same integer, and N, M, P and I can all be the same integer. In one example, the macroblock 212 can consist of one block of 16×16 luma pixels and two blocks of 8×8 chroma pixels. In another example, a block of luma pixels can be a 16×8 pixel block. Further, the blocks can be divided or grouped in other combinations (e.g., a 16×16 luma block can be represented as a set of sixteen 4×4 luma blocks).

The predictor blocks found by the identification component 104 can include a set of macroblocks, the macroblock 212 and/or the blocks 214. However, it is to be appreciated that other types of units or regions of an image frame or a video frame can be considered predictor blocks. For example, other types of units or regions of an image frame or a video frame can include, but is not limited to, sub-macroblocks, motion granularity units, and/or other types of image compression units.

Figure 3:
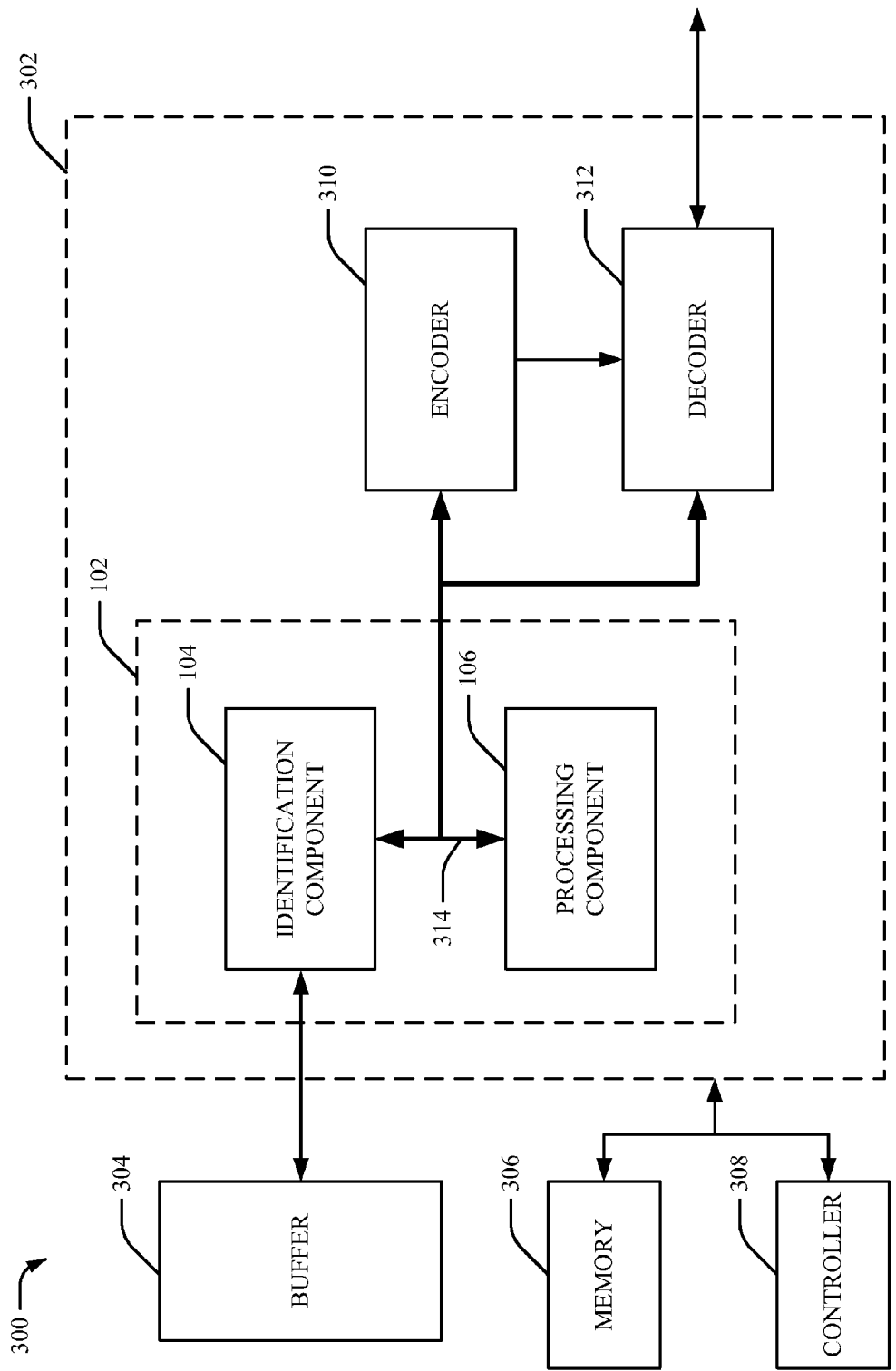
FIG. 3 illustrates another example block diagram of a codec system in accordance with various aspects and implementations described herein.

Referring now to FIG. 3, there is illustrated a non-limiting implementation of a codec system 300 in accordance with this disclosure. The system 300 can include a codec 302, a buffer 304, a memory 306 and a controller 308. The codec 302 can include the codec component 102, an encoder 310 and a decoder 312. The codec component 102 can include the identification component 104 and the processing component 106. Data can be transmitted between the identification component 104, the processing component 106, the encoder 310 and/or the decoder 312 via a system bus 314. However, it is to be appreciated that data can be transmitted between the identification component 104, the processing component 106, the encoder 310 and/or the decoder 312 via a different type of communication interface. The identification component 104 can receive one or more image frames from the buffer 304. The buffer 304 can be implemented as one or more buffers. Although represented as being outside the codec 302, the buffer 304 can be contained within the codec 302.

In one example, the buffer 304 can be implemented as a reference buffer. For example, a previously coded reference frame can be or include one or more reference buffers stored in the buffer 304 that have been previously coded, but do not comprise a direct 1:1 correspondence to a real frame in an input video sequence. In another example, the buffer 304 can be implemented as a hidden reference buffer. In yet another example, the buffer 304 can be implemented as an input image frame buffer. The buffer 304 can be any form of volatile and/or non-volatile memory. For example, the buffer 304 can include, but is not limited to, magnetic storage devices, optical storage devices, smart cards, flash memory (e.g., single-level cell flash memory, multi-level cell flash memory), read-only memory (ROM), programmable read-only memory (PROM), erasable programmable read-only memory (EPROM), electrically erasable programmable read-only memory (EEPROM), random-access memory (RAM) or non-volatile random-access memory (NVRAM) (e.g., ferroelectric random-access memory (FeRAM)), or a combination thereof. Further, a flash memory can comprise NOR flash memory and/or NAND flash memory.

The processing component 106 can receive data from the identification component 104 and/or from components outside of the codec 302. For example, the processing component 106 can receive data from the buffer 304. The processing component 106 can also transmit data to the encoder 310. For example, the processing component 106 can transmit new predictor block data to the encoder 310. Additionally or alternatively, the processing component 106 can transmit motion vectors, prediction information, information corresponding to weighted pixels, etc. In one example, the processing component 106 can additionally or alternatively transmit data to other components (e.g., an external storage device).

The controller 308 can be configured to control the codec 302 and can be coupled to the memory 306. The memory 306 can provide workable space (e.g., random-access memory (RAM), storage space, read/write space) for the controller 308. Furthermore, the memory 306 can comprise volatile and/or non-volatile memory. In one example, the controller 308 can comprise one or more processors. The one or more processors can be configured to execute instructions stored in computer readable memory.

The encoder 310 can be configured to efficiently encode digital media data. The encoder 310 can encode received digital media data (e.g., digital video content, audio content, still image, multimedia content, etc.) to produce encoded digital media data (e.g., a bitstream) as an output. The encoder 310 can encode or compresses the digital media data in accordance with one or more predefined compression algorithms and/or one or more encoding algorithms. The encoder 310 can also implement a threshold temporal filter to encode or compress the digital media data. The encoder 310 can transmit a bitstream to the decoder 312. The bitstream can include compressed data, such as but not limited to, new predictor block data and/or a residual signal.

Additionally or alternatively, the encoder 310 can transmit a bitstream to other components (e.g., an external storage device). The bitstream can also contain information to aid decoding. For example, the bitstream can also contain motion vectors, quantization information, prediction information, etc. In one example, the encoder 310 can encode and/or transmit a reference frame to the decoder 312 that is not based on a single real frame. For example, the encoder 310 can encode and/or transmit a constructed reference frame or reference buffer (which may be constructed, for example, by combining a group of frames using a thresholded temporal filter). This constructed reference frame or reference buffer can be available to predict data in subsequently coded frames, but not displayed (e.g., is not transmitted to a display device). In one example, a marker (e.g., a flag) can be implemented in the bitstream to indicate that a frame is for prediction only, and not for display. The encoder 310 can be a stand-alone unit, part of the codec 302, part of another component or unit, or can have portions of the encoder 310 distributed in multiple components or units of the system 300.

The decoder 312 can receive encoded digital media data (e.g., a bitstream). The decoder 312 can receive the bitstream via a bus from the memory 306 or from the processing component 106. The decoder 312 can be configured generate decoded digital media data (e.g., a decoded bitstream). The decoder 312 can be a stand-alone unit, part of the codec 302, part of another component or unit, or can have portions of the decoder 312 distributed in multiple components or units of the system 300.

While FIG. 3 depicts the encoder 310 and the decoder 312 on a common codec 302, it is to be appreciated that the encoder 310 and the decoder 312 can be implemented on separate components. For example, the codec 302 can include the identification component 104, the processing component 106 and/or the encoder 310 and not the decoder 312. In another example, the codec 302 can include the identification component 104, the processing component 106 and/or the decoder 312 and not the encoder 310. Further, it can be appreciated that the design of system 300 can include different component selections, component placements, etc., to achieve an optimal performance. The codec 302 can refer to hardware, a combination of hardware and software, or software. Likewise, the identification component 104, the processing component 106, the encoder 310 and/or the decoder 312 can refer to hardware, a combination of hardware and software, or software. It is to be understood that a codec as used herein can refer to at least one of an encoder or decoder.

Figure 4:
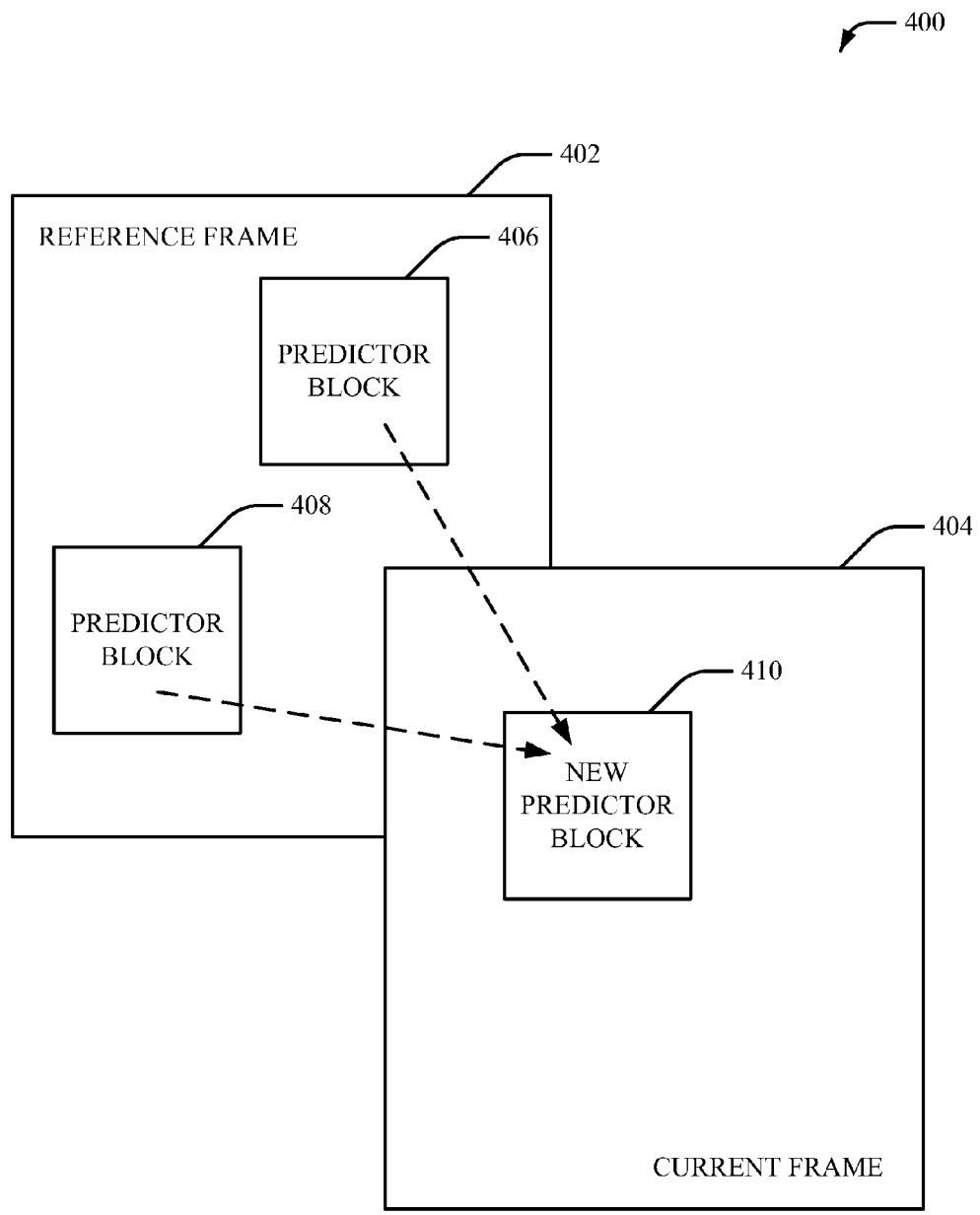
FIG. 4 illustrates a non-limiting implementation for combining inter predictors in accordance with various aspects and implementations described herein.

Referring now to FIG. 4, there is illustrated a non-limiting implementation of a system 400 for combining inter predictors in accordance with this disclosure. The system 400 can include a reference frame 402 and a current frame 404. The reference frame 402 can include a predictor block 406 and a predictor block 408. However, it is to be appreciated that the reference frame 402 can include more than two predictor blocks. The current frame 404 can include a new predictor block 410. In one example, the reference frame 402 can be a partially coded reference frame. In another example, the reference frame 402 can be an entirely coded reference frame. The predictor block 406 and the predictor block 408 can be located in a coded region (e.g., a previously coded region) of the reference frame 402. In one example, the reference frame 402 can be stored in the buffer 304.

The new predictor block 410 can be generated (e.g., predicted) by combining the predictor block 406 and the predictor block 408. For example, the new predictor block 410 can be generated using motion vectors from the predictor block 406 and the predictor block 408. The relative weighting given to the predictor block 406 and the predictor block 408 can be explicitly or implicitly coded. For example, weighting given to the predictor block 406 and the predictor block 408 can depend on the temporal and/or spatial distance of the predictor block 406 and the predictor block 408 from the new predictor block 410. In another example, weighting given to the predictor block 406 and/or the predictor block 408 can depend on predetermined weights. Weighted prediction modes from the predictor block 406 can also be combined with weighted prediction modes from the predictor block 408. In another example, filtered and/or averaged data from the predictor block 406 can be combined with filtered and/or averaged data from the predictor block 408. It is to be appreciated that more than two predictor blocks can be combined to generate the new predictor block 410.

Figure 5:
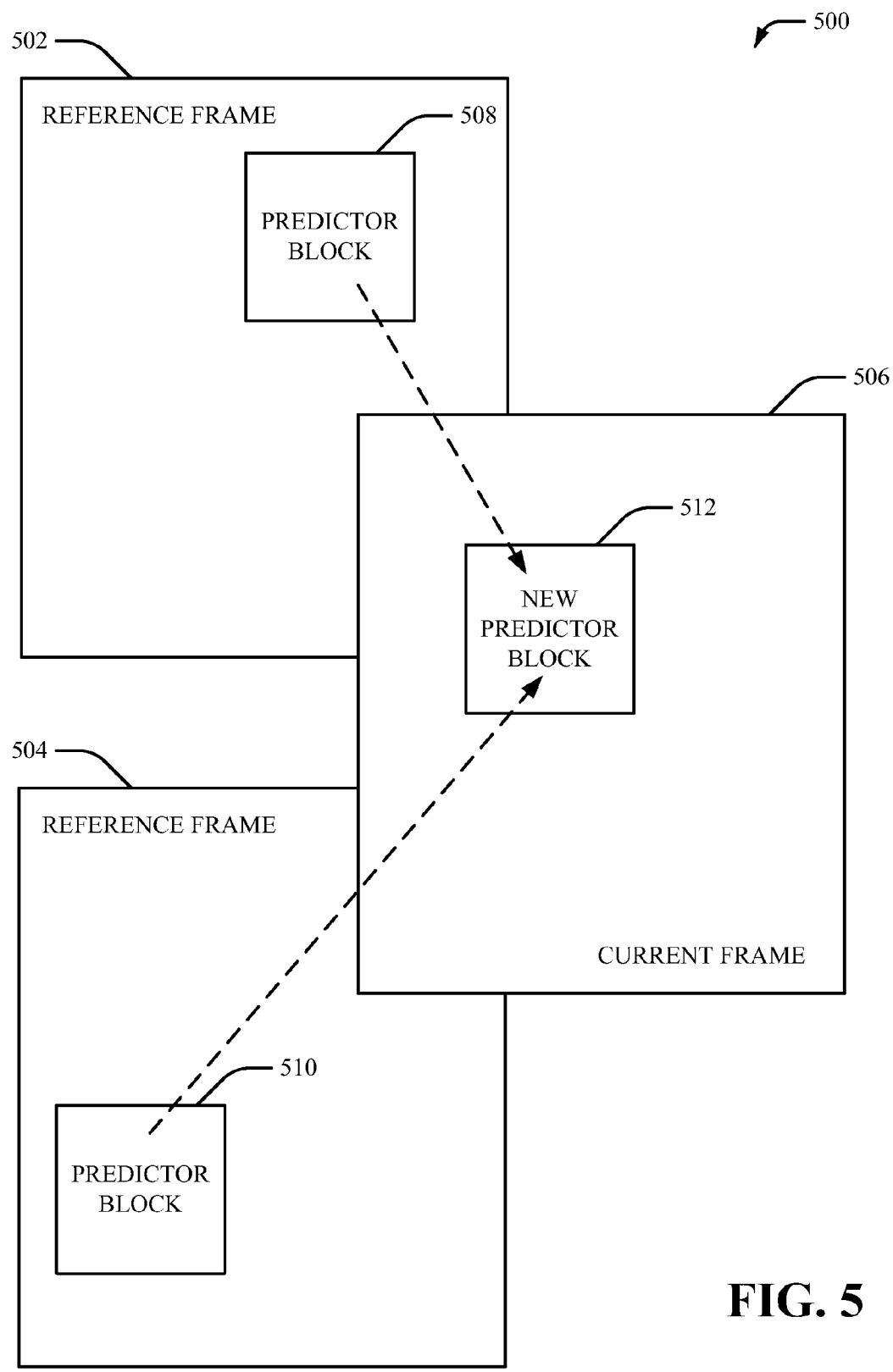
FIG. 5 illustrates another non-limiting implementation for combining inter predictors in accordance with various aspects and implementations described herein.

Referring now to FIG. 5, there is illustrated a system 500 for implementing another non-limiting implementation for combining inter predictors in accordance with this disclosure. The system 500 can include a reference frame 502, a reference frame 504 and a current frame 506. The reference frame 502 can include a predictor block 508. The reference frame 504 can include and a predictor block 510. The current frame 506 can include a new predictor block 512. In one example, the reference frame 502 and/or the reference frame 504 can be a partially coded reference frame. In another example, the reference frame 502 and/or reference frame 504 can be an entirely coded reference frame. The predictor block 508 can be located in a coded region (e.g., a previously coded region) of the reference frame 502. Similarly, the predictor block 510 can be located in a coded region (e.g., a previously coded region) of the reference frame 504. In one example, the reference frame 502 and/or the reference frame 504 can be stored in the buffer 304.

The new predictor block 512 can be generated (e.g., predicted) by combining the predictor block 508 and the predictor block 510. For example, the new predictor block 512 can be generated using motion vectors from the predictor block 508 and the predictor block 510. The relative weighting given to the predictor block 508 and the predictor block 510 can be explicitly or implicitly coded. For example, weighting given to the predictor block 508 and the predictor block 510 can depend on the length of the motion vectors corresponding to the spatial offset and/or distance of the predictor block 508 and the predictor block 510 from the new predictor block 512.

In another example, weighting given to the predictor block 508 and/or the predictor block 510 can depend on predetermined weights. Weighted prediction modes from the predictor block 508 can also be combined with weighted prediction modes from the predictor block 510. In another example, filtered and/or averaged data from the predictor block 508 can be combined with filtered and/or averaged data from the predictor block 510. It is to be appreciated that more than one predictor block from the reference frame 502 and/or more than one predictor block from the reference frame 504 can be combined to generate the new predictor block 512. It is also to be appreciated that three or more predictor blocks can be combined from three or more reference frames.

Figure 6:
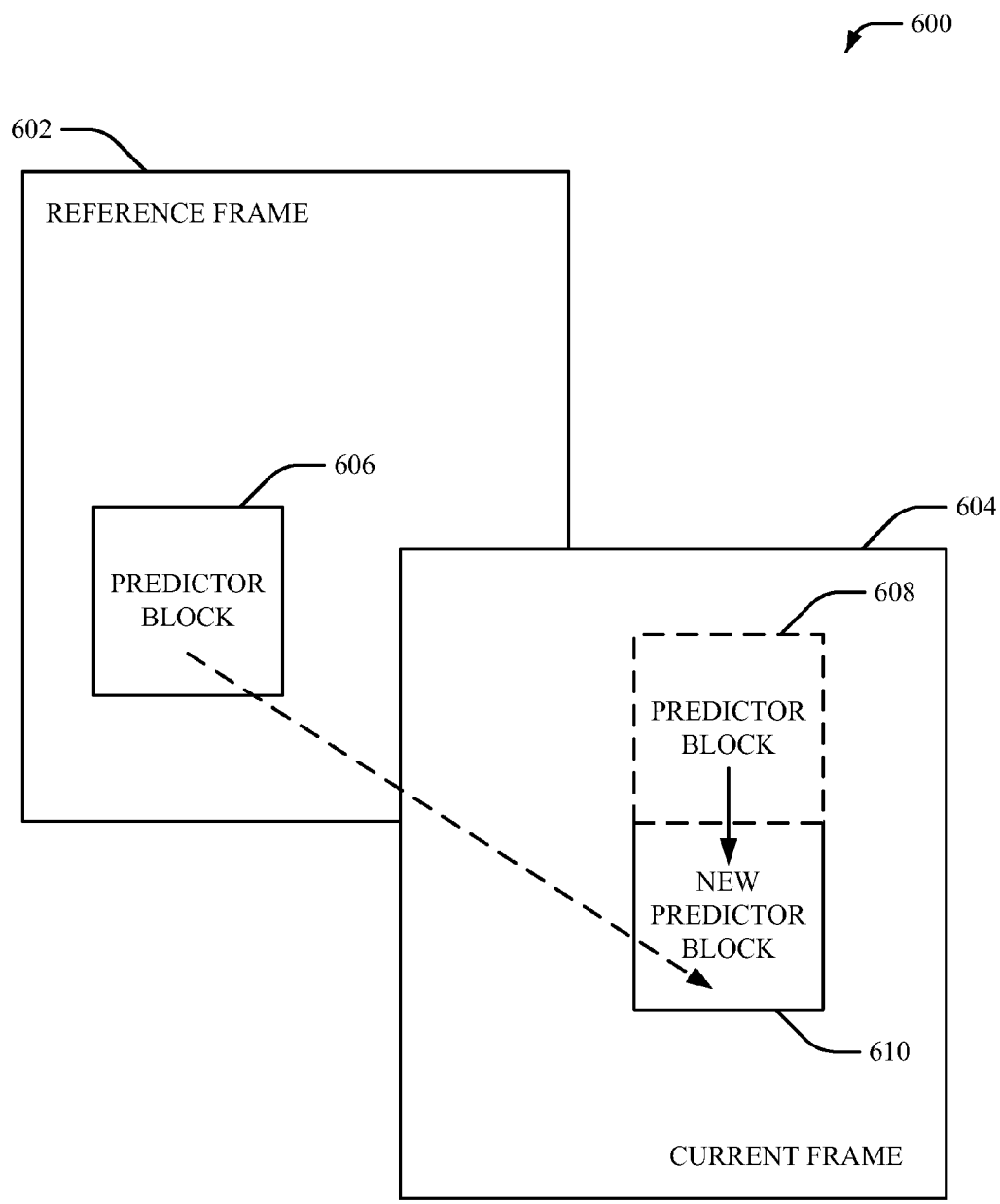
FIG. 6 illustrates a non-limiting implementation for combining inter predictors and intra predictors in accordance with various aspects and implementations described herein.

Referring now to FIG. 6, there is illustrated a non-limiting implementation of a system 600 for combining inter predictors and intra predictors in accordance with this disclosure. The system 600 can include a reference frame 602 and a current frame 604. The reference frame 602 can include a predictor block 606. The current frame 604 can include a predictor block 608 and a new predictor block 610. In one example, the reference frame 602 and/or the current frame 604 can be a partially coded reference frame. In another example, the reference frame 602 can be an entirely coded reference frame. The predictor block 606 can be located in a coded region (e.g., a previously coded region) of the reference frame 602. The predictor block 608 can be located in a coded region (e.g., a previously coded region) of the current frame 604. In one example, the reference frame 602 can be stored in the buffer 304.

The new predictor block 610 can be generated by combining data from the predictor block 606 and data from the predictor block 608. In one example, weighting given to the predictor block 606 and the predictor block 608 can depend on predetermined weights. Weighted pixels or weighted prediction modes from the predictor block 606 can also be combined with weighted pixels or weighted prediction modes from the predictor block 608. In another example, filtered and/or averaged data from the predictor block 606 can be combined with filtered and/or averaged data from the predictor block 608. It is to be appreciated that more than one predictor block from the reference frame 602 and/or more than one predictor block from the current frame 604 can be combined to generate the new predictor block 610. It is also to be appreciated that two or more predictor blocks from two or more reference frames can be combined with one or more predictor blocks from a current frame.

Figure 7:
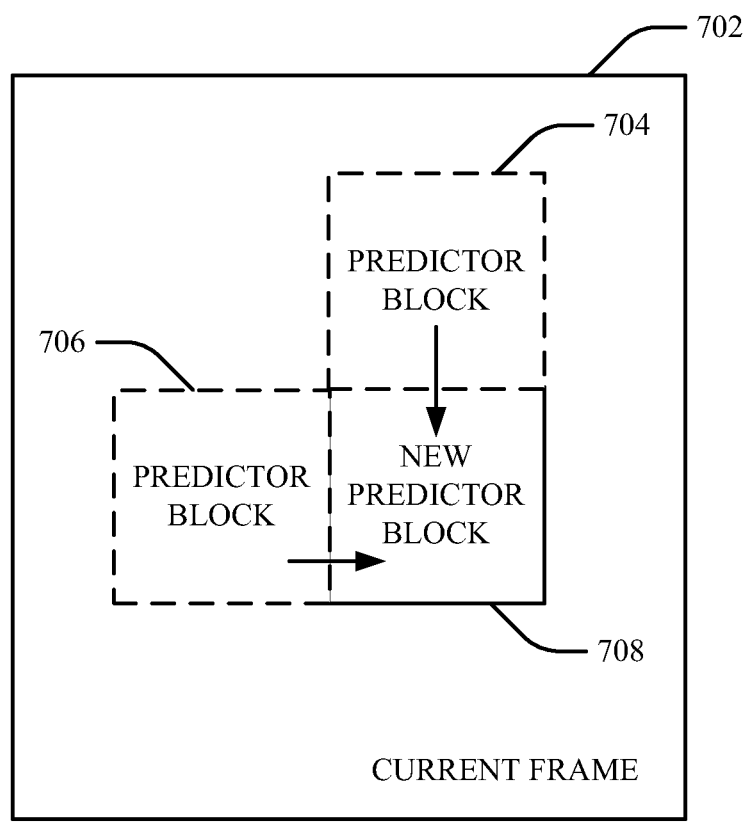
FIG. 7 illustrates a non-limiting implementation for combining intra predictors in accordance with various aspects and implementations described herein.

Referring now to FIG. 7, there is illustrated a non-limiting implementation of a system 700 for combining intra predictors in accordance with this disclosure. The system 700 can include a current frame 702. The current frame 702 can include a predictor block 704, a predictor block 706 and a new predictor block 708. However, it is to be appreciated that the current frame 702 can include more than two predictor blocks. In one example, the current frame 702 can be a partially coded reference frame. The predictor block 704 and the predictor block 706 can be located in a coded region (e.g., a previously coded region) of the current frame 702. In one example, the predictor block 704 can be located immediately above the new predictor block 708 and the predictor block 706 can be located immediately to the left of the new predictor block 708. However, it is to be appreciated that the predictor block 704, the predictor block 706 and the new predictor block 708 can be located anywhere in the current frame 702.

The new predictor block 708 can be generated by combining two or more existing intra prediction modes (e.g., intra prediction modes from the predictor block 704 and the predictor block 706). For example, the intra prediction modes can include, but are not limited to, DC prediction (DC_PRED), horizontal prediction (H_PRED), vertical prediction (V_PRED) and/or TrueMotion prediction (TM_PRED). The intra prediction modes can be combined using explicit or implicit weights. Therefore, pseudo-directional predictors can be generated. Additionally, predictors can be generated based on the relative spatial distance of the plurality of decoded pixels (e.g., for each individual predicted pixel value) that contribute to the predicted value. In one example, weighting given to the predictor block 704 and the predictor block 706 can depend on predetermined weights. Weighted pixels or weighted prediction modes from the predictor block 704 can also be combined with weighted pixels or weighted prediction modes from the predictor block 706. In another example, filtered and/or averaged data from the predictor block 704 can be combined with filtered and/or averaged data from the predictor block 706.

Figure 8:
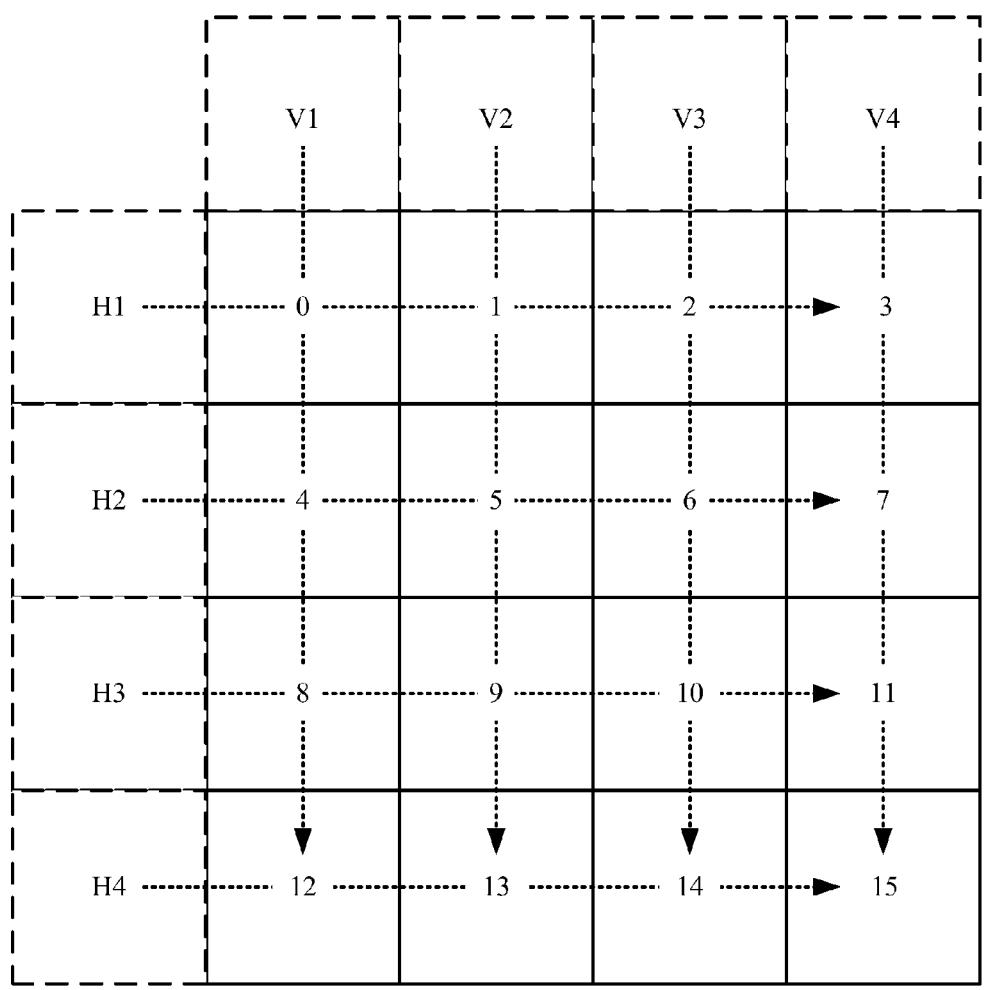
FIG. 8 illustrates a non-limiting implementation for combining pixels from more than one intra predictor in accordance with various aspects and implementations described herein.

Referring now to FIG. 8, there is illustrated a non-limiting implementation of a system 800 for combining pixels from more than one intra predictor in accordance with this disclosure. In this example, a first primary predictor block (e.g., derived from the predictor block 704 with 4×4 pixels) can be derived (e.g., generated) by implementing V_PRED. For example, the values of pixels (e.g., pixels V1-V4) in the bottom row of the predictor block 704 can be duplicated downward to generate the first primary predictor block (e.g., a 4×4 block of pixels). A second primary predictor block (e.g., derived from the predictor block 706) can be derived (e.g., generated) by implementing H_PRED. For example, the values of pixels (e.g., pixels H1-H4) on the right edge (e.g., far right column) of the predictor block 706 can be duplicated horizontally to generate the second primary predictor block (e.g., a 4×4 block of pixels). The first primary predictor block and/or the second primary predictor block can be combined in a variety of ways to generate the new predictor block 708. For example, the first primary predictor block and the second primary predictor block can be combined using averaging and/or filtering. In another example, the first primary predictor block and the second primary predictor block can be combined using explicitly coded or implicitly coded weights.

In the non-limiting example shown in FIG. 8, the new predictor block 708 can be generated by combining the pixels V1-V4 and the pixels H1-H4. The new predictor block 708 can be a 4×4 block of pixels. As such, pixel 0 can include a combination of H1 and V1, pixel 1 can include a combination of H1 and V2, pixel 2 can include a combination of H1 and V3, and pixel 3 can include a combination of H1 and V4. Similarly, pixel 4 can include a combination of H2 and V1, pixel 5 can include a combination of H2 and V2, pixel 6 can include a combination of H2 and V3, and pixel 7 can include a combination of H2 and V4. Likewise, pixel 8 can include a combination of H3 and V1, pixel 9 can include a combination of H3 and V2, pixel 10 can include a combination of H3 and V3, and pixel 11 can include a combination of H3 and V4. In the same way, pixel 12 can include a combination of H4 and V1, pixel 13 can include a combination of H4 and V2, pixel 14 can include a combination of H4 and V3, and pixel 15 can include a combination of H4 and V4.

In one example, the implicit weight given to contributing predictors can employ spatial distance of a predicted pixel from the values that contribute to the prediction. For example, as seen in FIG. 8, pixel 15 is equidistant from both H4 and V4. Therefore, H4 and V4 can be equally weighted for calculating the predictor for pixel 15. In another example, pixel 3 is closer to V4 than to H1. Therefore, V4 can be weighted more than H1 for calculating the predictor for pixel 3. In yet another example, pixel 9 is closer to H3 than to V2. Therefore, H3 can be weighted more than V2 for calculating the predictor for pixel 9. As such, weight for each pixel 0-15 can be uniquely determined. It is to be appreciated that other combinations of two or more intra prediction modes are possible. It is also to be appreciated that other techniques can be implemented for implicitly weighting the relative contribution of pixels. For example, other techniques for implicitly weighting the relative contribution of pixels can include, but are not limited to, determining quality of previous predictor blocks (e.g., determining quality of output media data) and/or frequency of use for each contributing inter prediction mode and/or intra prediction mode to determine future weights (e.g., possible weighted values).

Figure 9:
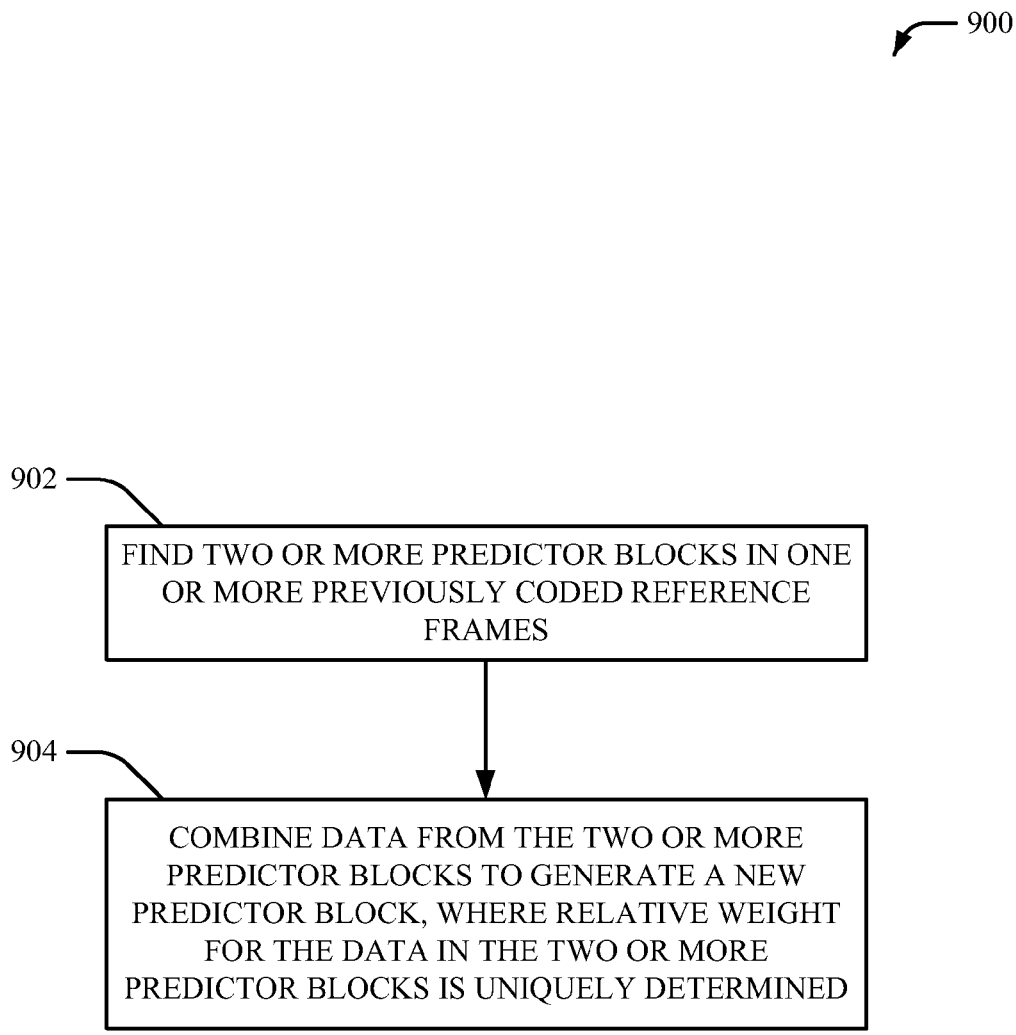
FIG. 9 depicts a flow diagram of an example method for combining inter predictors, in accordance with various aspects and implementations described herein.
Figure 10:
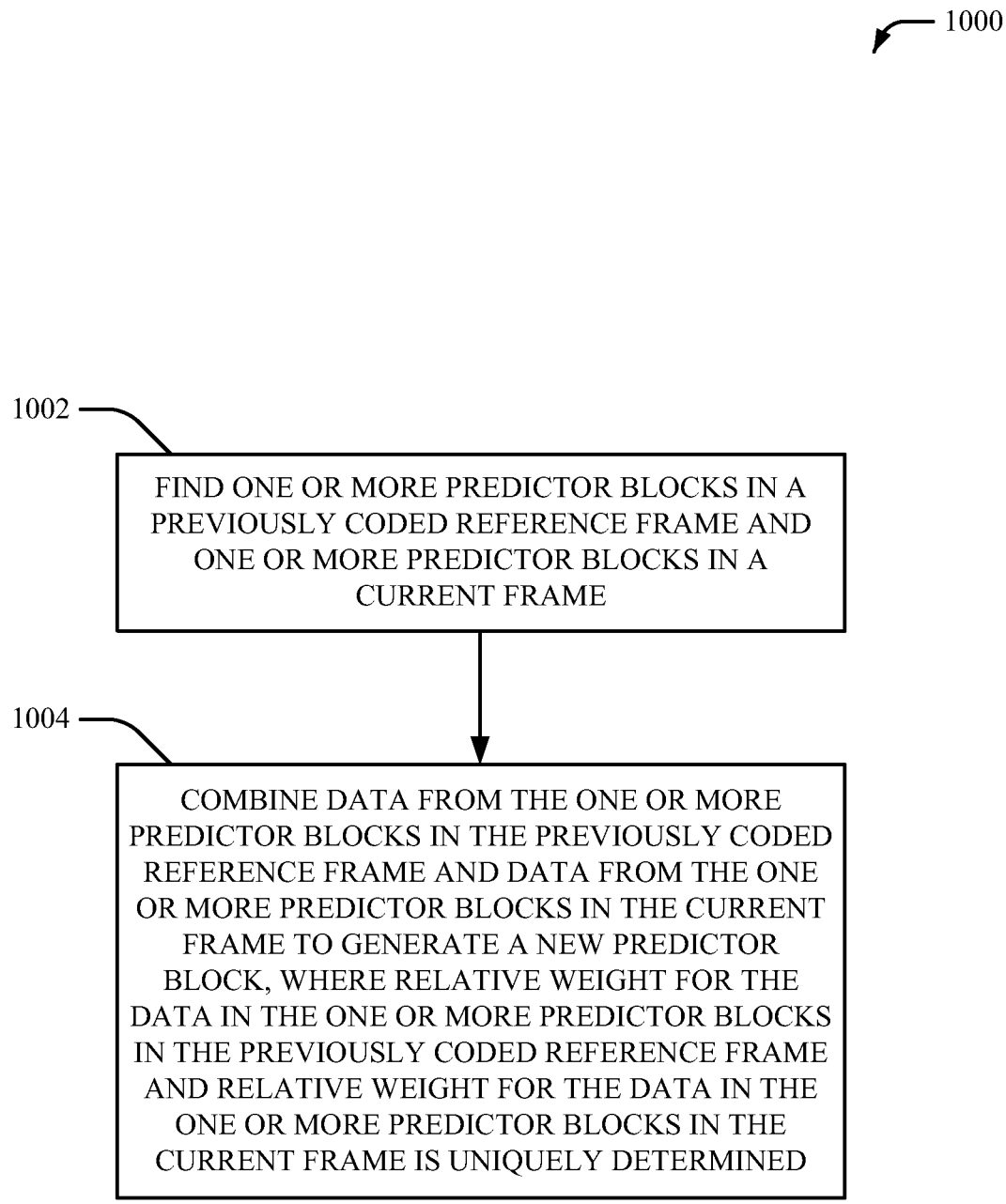
FIG. 10 depicts a flow diagram of an example method for combining inter predictors and intra predictors, in accordance with various aspects and implementations described herein.
Figure 11:
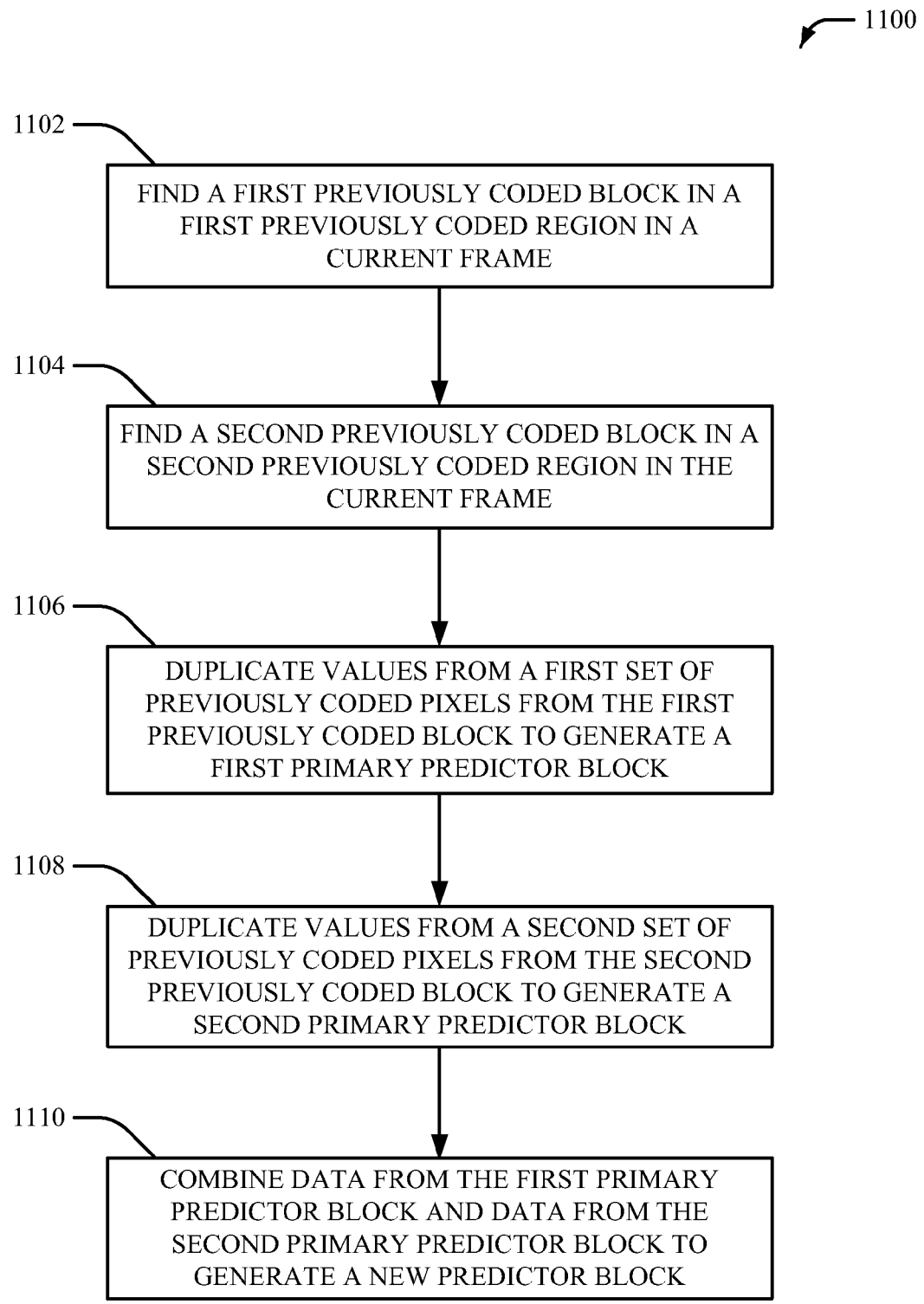
FIG. 11 depicts a flow diagram of an example method for combining intra predictors, in accordance with various aspects and implementations described herein.

FIGS. 9-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there illustrated is a methodology 900 for combining a plurality of predictors from one or more sources to generate a new compound predictor, according to an aspect of the subject innovation. As an example, methodology 900 can be utilized in various codec applications, such as, but not limited to, media capturing systems, media displaying systems, computing devices, cellular phones, tablets, personal data assistants (PDAs), laptops, personal computers, audio/video devices, etc. Moreover, the methodology 900 is configured to provide a new predictor block by combining inter predictors from previously coded reference frames. Specifically, methodology 900 is configured to generate a new predictor block by combining data (e.g., combining weighted data, averaging data, filtering data, etc.) from previously coded regions of one or more previously coded reference frames.

Initially, video information can be captured or can be contained within memory (e.g., within a buffer 304). At 902, two or more predictor blocks can be found (e.g., using an identification component 104) in one or more previously coded reference frames. For example, a first predictor block (e.g., a predictor block 406) can be found in a first previously coded region of a previously coded reference frame (e.g., a reference frame 402) and a second predictor block (e.g., a predictor block 408) can be found in a second previously coded region of the previously coded reference frame. In another example, a first predictor block (e.g., a predictor block 508) can be found in a previously coded region of a first previously coded reference frame (e.g., a reference frame 502) and a second predictor block (e.g., a predictor block 510) can be found in a previously coded region of a second previously coded reference frame (e.g., a reference frame 504).

At 904, data from the two or more predictor blocks can be combined (e.g., using a processing component 106) to generate a new predictor block. Relative weight for the data in the two or more predictor blocks can be uniquely determined. For example, weighted pixels from the first predictor block can be combined with weighted pixels from the second predictor block. In another example, weighted prediction modes from the first predictor block can be combined with weighted prediction modes from the second predictor block. In yet another example, filtered and/or averaged data from the first predictor block can be combined with filtered and/or averaged data from the second predictor block. As such, a new predictor block (e.g., a new predictor block 410 or a new predictor block 512) can be generated by combining data from the first predictor block with data from the second predictor block. However, it is to be appreciated that more than two predictor blocks from one or more previously coded reference frames can be combined to generate a new predictor block.

Referring to FIG. 10, there illustrated is a methodology 1000 for combining inter predictors and intra predictors according to an aspect of the subject innovation. At 1002, one or more predictor blocks in a previously coded reference frame and one or more predictor blocks in a current frame can be found (e.g., using an identification component 104). For example, a first predictor block (e.g., a predictor block 606) can be found in a previously coded region of a previously coded reference frame (e.g., a reference frame 602) and a second predictor block (e.g., a predictor block 608) can be found in a previously coded region of a current frame (e.g., a current frame 604).

At 1004, data from the one or more predictor blocks in the previously coded reference frame and data from the one or more predictor blocks in the current frame can be combined (e.g., using a processing component 106) to generate a new predictor block. Relative weight for the data in the one or more predictor blocks in the previously coded reference frame and relative weight for the data in the one or more predictor blocks in the current frame can be uniquely determined. For example, weighted pixels from the first predictor block can be combined with weighted pixels from the second predictor block. In another example, weighted prediction modes from the first predictor block can be combined with weighted prediction modes from the second predictor block. In yet another example, filtered and/or averaged data from the first predictor block can be combined with filtered and/or averaged data from the second predictor block. As such, a new predictor block (e.g., a new predictor block 610) can be generated by combining data from the first predictor block with data from the second predictor block. However, it is to be appreciated that more than one predictor block from one or more previously coded reference frames and/or more than one predictor block from a current frame can be combined to generate a new predictor block.

Referring to FIG. 11, there illustrated is a methodology 1100 for combining intra predictors according to an aspect of the subject innovation. At 1102, a first previously coded block in a first previously coded region in a current frame can be found (e.g., using an identification component 104). For example, a first predictor block (e.g., a predictor block 704) can be found in a first previously coded region of a current frame (e.g., a current frame 702). At 1104, a second previously coded block in a second previously coded region in the current frame can be found (e.g., using an identification component 104). For example, a second predictor block (e.g., a predictor block 706) can be found in a second previously coded region of the current frame.

At 1106, values from a first set of previously coded pixels from the first previously coded block can be duplicated (e.g., using a processing component 106) to generate a first primary predictor block. For example, values of pixels (e.g., pixels V1-V4) in the bottom row of the first predictor block can be duplicated downward to generate a first primary predictor block (e.g., a 4×4 block of pixels). At 1108, values from a second set of previously coded pixels from the second previously coded block can be duplicated (e.g., using a processing component 106) to generate a second primary predictor block. For example, values of pixels (e.g., pixels H1-H4) on the right edge (e.g., far right column) of the second predictor block can be duplicated horizontally to generate a second primary predictor block (e.g., a 4×4 block of pixels).

At 1110, data from the first primary predictor block and data from the second primary predictor block can be combined (e.g., using a processing component 106) to generate a new predictor block. For example, weighted pixels from the first primary predictor block can be combined with weighted pixels from the second primary predictor block. In another example, weighted prediction modes from the first primary predictor block can be combined with weighted prediction modes from the second primary predictor block. In yet another example, filtered and/or averaged data from the first primary predictor block can be combined with filtered and/or averaged data from the second primary predictor block. As such, a new predictor block (e.g., a new predictor block 708) can be generated by combining data from the first primary predictor block with data from the second primary predictor block. However, it is to be appreciated that more than two predictor blocks from a current frame can be combined to generate a new predictor block.

What has been described above includes examples of the implementations of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated implementations of the subject disclosure is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not illustrated herein.

In regards to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
    a memory that stores computer executable components; and
    a processor that executes the following computer executable components stored within the memory:
    an identification component configured to find two or more predictor blocks for predicting a current block in a current frame, wherein each of the two or more predictor blocks is comprised of a same pixel dimensions as the current block and is generated using an inter prediction mode or an intra prediction mode in one of a previously coded reference frame or the current frame; and
    a processing component configured to generate a new predictor block for encoding the current block by combining weighted pixels of the two or more predictor blocks, and wherein the weighted pixels of the two or more predictor blocks are determined based on quality of previous predictor blocks.

2. The system of claim 1, wherein at least one of the two or more predictor blocks is located in a previously coded region of the current frame.

3. The system of claim 1, wherein the weighted pixels of the two or more predictor blocks are determined based on distance of pixels in the two or more predictor blocks from pixels in the new predictor block.

4. The system of claim 1, wherein the weighted pixels of the two or more predictor blocks are determined based on length of motion vectors.

5. The system of claim 1, wherein a first predictor block is located in a first previously coded reference frame and a second predictor block is located in a second previously coded reference frame.

6. The system of claim 1, wherein a first predictor block and a second predictor block is located in a previously coded reference frame.

7. The system of claim 1, wherein a first predictor block is located in a previously coded reference frame and a second predictor block is located a previously coded region in the current frame.

8. The system of claim 1, wherein a first predictor block is generated from a first set of previously coded pixels in the current frame and a second predictor block is generated from a second set of previously coded pixels in the current frame.

9. A method, comprising:
employing a microprocessor to execute computer executable instructions stored in a memory to perform the following acts:
finding two or more predictor blocks in one or more previously coded reference frames for predicting a current block of a current frame, wherein each of the two or more predictor blocks is comprised of a same pixel dimensions as the current block and is generated using an inter prediction mode; and
combining data from the two or more predictor blocks to generate a new predictor block for encoding the current block by weighting the data, wherein relative weight for the data in the two or more predictor blocks is determined based on quality of the two or more predictor blocks.

10. The method of claim 9, wherein the combining includes combining weighted pixels or weighted prediction modes of the two or more predictor blocks.

11. The method of claim 9, wherein the finding includes finding one or more predictor blocks in a first reference frame and one or more predictor blocks in a second reference frame.

12. A method, comprising:
employing a microprocessor to execute computer executable instructions stored in a memory to perform the following acts:
finding one or more predictor blocks in a previously coded reference frame and one or more predictor blocks in a previously coded region of a current frame for predicting a current block of a current frame, wherein each of the one or more predictor blocks in the previously coded reference frame is comprised of a same pixel dimensions as the current block and is generated using an inter prediction mode, and wherein each of the one or more predictor blocks in the current frame is comprised of the same pixel dimensions as the current block and is generated using a respective intra prediction mode; and
combining data from the one or more predictor blocks in the previously coded reference frame and data from the one or more predictor blocks in the previously coded region of the current frame to generate a new predictor block for encoding the current block, wherein relative weight for the data in the one or more predictor blocks in the previously coded reference frame and relative weight for the data in the one or more predictor blocks in the current frame is determined based on quality of previous predictor blocks.

13. The method of claim 12, wherein the combining includes combining weighted pixels of the one or more predictor blocks in the previously coded reference frame with weighted pixels of the one or more predictor blocks in the previously coded region of the current frame.

14. The method of claim 12, wherein the combining includes combining weighted prediction modes of the one or more predictor blocks in the previously coded reference frame with weighted prediction modes of the one or more predictor blocks in the previously coded region of the current frame.

15. A method, comprising:
employing a microprocessor to execute computer executable instructions stored in a memory to perform the following acts:
finding a first previously coded block in a first previously coded region in a current frame;
finding a second previously coded block in a second previously coded region in the current frame;
duplicating values from a first set of previously coded pixels from the first previously coded block using a first intra prediction mode to generate a first primary predictor block for predicting a current block of the current frame;
duplicating values from a second set of previously coded pixels from the second previously coded block using a second intra prediction mode to generate a second primary predictor block for predicting the current block; and
combining data from the first primary predictor block and data from the second primary predictor block to generate a new predictor block for encoding the current block, wherein each of the first primary predictor block and the second primary predictor block have a same pixel dimensions as the current block, wherein the combining the data from the first primary predictor block and the data from the second primary predictor block includes combining weighted pixels of the first primary predictor block and the second primary predictor block, and wherein the weighted pixels of the first primary predictor block and the second primary predictor block are determined based on quality of the first previously coded block and the second previously coded block.

16. The method of claim 15, wherein the combining the weighted pixels includes combining relative weight of the first set of previously coded pixels and the second set of previously coded pixels based on distance of the first set of previously coded pixels and the second set of previously coded pixels from pixels in the new predictor block.

17. The system of claim 1, wherein a weight for a particular one of the weighted pixels of the two or more predictor blocks is uniquely determined.

18. The system of claim 1, wherein a weight for at least some of pixels of a first predictor block of the two or more predictor blocks is different from a weight of pixels of a second predictor block of the two or more predictor blocks.

19. The system of claim 1, wherein the previous predictor blocks comprise blocks forming at least one predictor block of the two or more prediction blocks.

20. The method of claim 9, wherein the relative weight for the data in the two or more predictor blocks is further determined based on frequency of use for each of at least one of an inter prediction mode or an intra prediction mode used to generate the two or more predictor blocks.

* * * * *